Dec. 17, 1968     C. R. SHOLL     3,416,813
REMOVABLE WHEELS FOR BOATS
Filed Oct. 4, 1966
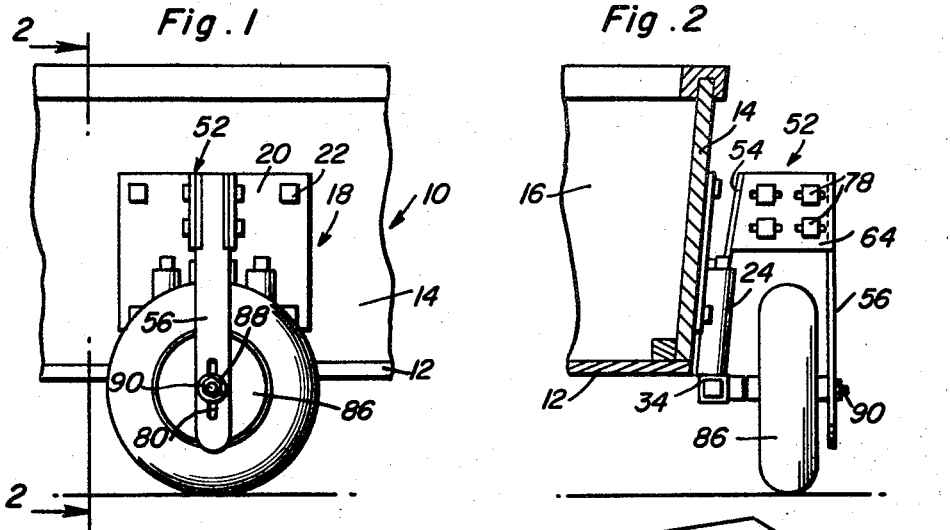
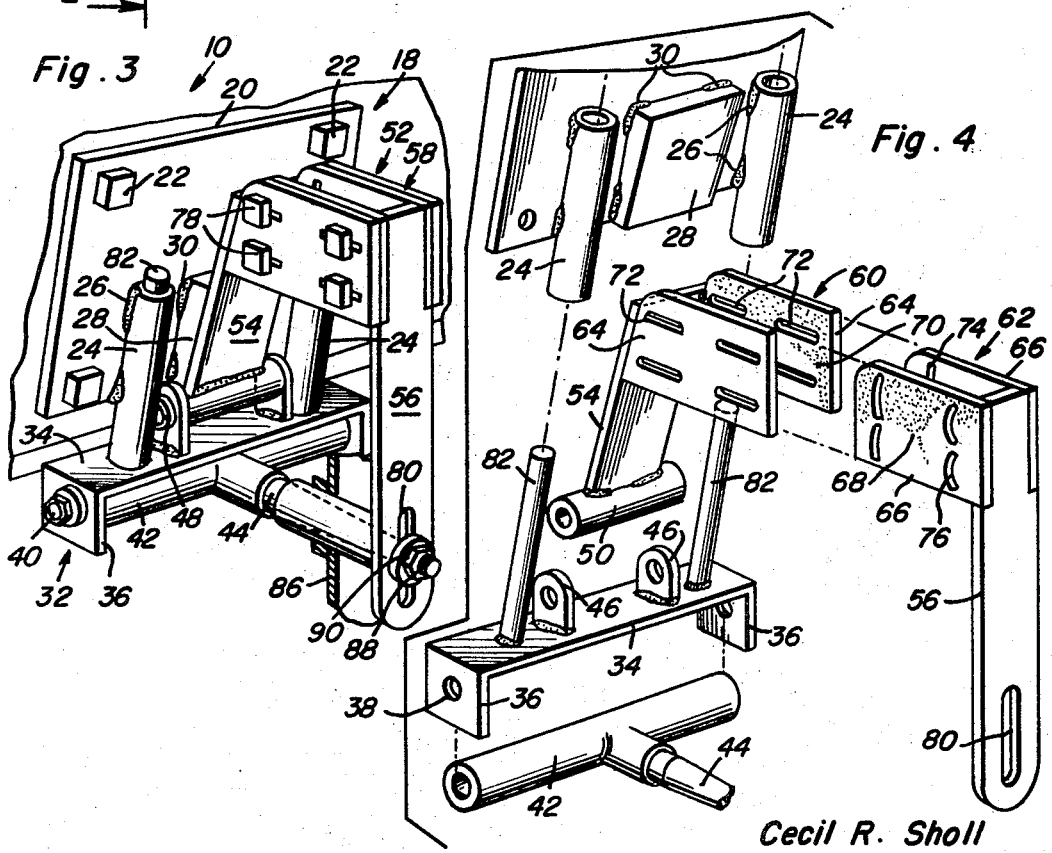
Cecil R. Sholl
INVENTOR.

United States Patent Office 3,416,813
Patented Dec. 17, 1968

3,416,813
REMOVABLE WHEELS FOR BOATS
Cecil R. Sholl, P.O. Box 681,
Kodiak, Alaska 99615
Continuation-in-part of application Ser. No. 402,560,
Oct. 8, 1964. This application Oct. 4, 1966, Ser.
No. 584,271
10 Claims. (Cl. 280—47.32)

ABSTRACT OF THE DISCLOSURE

A wheel mounting structure for a boat including a base member adapted for securement to one side of the associated boat for removably supporting a stub axle member therefrom for limited pivotal movement relative to the base or base member by a horizontal axis generally paralleling the associated boat. The wheel mounting structure includes an inverted generally U-shaped assembly adapted to embrace and bridge over the upper peripheral portions of a wheel journalled on the outer end of a stub axle with one leg supported from the base member and the free lower end of the other leg adjustably secured to the outer end of the stub axle member outwardly of the wheel journalled thereon.

---

This application comprises a continuation-in-part of my copending application Ser. No. 402,560, filed Oct. 8, 1964 for Removable Wheels and Trailing Tongue for Boats, now U.S. Patent No. 3,281,874.

The removable wheel structure of the instant invention has been specifically designed for use in adapting boats to be trailed from one location to another without the use of a boat trailer. The wheel structure of the instant invention has also been specifically designed for use on various types of boats including side walls from which the wheel structures are to be supported which are inclined various amounts relative to a vertical plane.

The removable wheel structure of the instant invention is constructed in a manner whereby the actual wheel journalling portion thereof may be readily removably secured to an associated boat by the use of a mounting bracket for the removable wheel structure which is to be permanently supported from an associated boat and upon which the wheel journalling structure of the removable wheel structure may be readily removably attached.

A final object of this invention to be specifically enumerated herein is to provide a removable wheel structure for boats which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a conventional form of boat hull shown with one of the removable wheel structures of the instant invention operatively supported therefrom;

FIGURE 2 is a fragmentary vertical sectional view taken substantially upon the plane indicated by the section line 2—2 of FIGURE 1;

FIGURE 3 is an enlarged perspective view of the portion of the boat to which the removable wheel structure is secured and more clearly illustrating the structural features of the removable wheel structure, the associated wheel being removed therefrom; and FIGURE 4 is an exploded perspective view of the removable supporting wheel structure of the instant invention.

Referring now more specifically to the drawings the numeral 10 generally designates the boat including a bottom 12, a pair of opposite sides 14 and a transom 16.

The transporting device of the instant invention is generally referred to by the reference numeral 18 and is adapted for support from the sides 14 whether they be vertically disposed or upwardly and outwardly inclined as illustrated in FIGURE 2 of the drawings.

The transporting device 18 includes a base plate 20 which may be secured to the corresponding side or side wall 14 in any convenient manner such as by fasteners 22. Each of the base plates 20 has a pair of tubular guides 24 secured thereto in any convenient manner such as by welding 26 and a wedge-shaped abutment block 28 is also secured to each base plate 20 in any convenient manner such as by welding 30 intermediate the corresponding pair of tubular guides 24.

The removable assembly of the transporting device 18 is generally referred to by the reference numeral 32 and includes a base flange 34 with a pair of downturned end portions 36 suitably apertured as at 38 so as to define a pair of apertured mounting flanges. A pivot bolt 40 is secured between the apertured end portions or mounting flanges 36 and a tubular member or sleeve 42 is journalled on the pivot bolt 40. The sleeve 42 includes a laterally outwardly directed and generally horizontally disposed stub axle 44 centrally intermediate its opposite ends and which projects outwardly from the base plate 20.

The base flange 34 includes a pair of upstanding apertured mounting ears 46 between which a pivot shaft 48 is secured. A sleeve 50 is journalled on the pivot shaft 48 and an inverted and generally U-shaped bridging structure referred to in general by the reference numeral 52 is secured between the sleeve 50 and the outer end of the stub axle 44. The bridging structure 52 includes first and second upstanding legs 54 and 56 interconnected at their upper ends by means of a bight portion assembly generally referred to by the reference numeral 58.

The bight portion assembly 58 includes a pair of opposite end sections generally referred to by the reference numerals 60 and 62 and it may be seen from FIGURE 4 of the drawings that the end section 60 comprises a pair of generally parallel and upstanding plates 64 secured to the upper portion of the leg 54 in any convenient manner such as by welding (not shown) and that the section 62 includes a pair of plates 66 secured to the upper end of the leg 56 in any convenient manner such as by welding (not shown).

The outer surfaces of the plates 66 are roughened as at 68 and the inner surfaces of the blades 64 are roughened as at 70. Further, the plates 64 are provided with two vertically spaced pairs of horizontally aligned and disposed slots 72 and the plates 66 include two pairs of vertically spaced slots 74 and 76, the slots 74 being vertically disposed and straight and the slots 76 being vertically disposed and slightly arcuate. The plates 64 are spaced apart a distance sufficient to snugly receive therebetween the spaced plates 66 and suitable fasteners 78 are secured through each pair of corresponding and registered slots 72 and 74 and 72 and 76. It is of course to be noted that, because of the horizontally elongated slots 72, the upper end of the leg 56 may be shifted laterally toward and away from the base plate 20. Further, because of the vertical extent of the slots 74 and 76, the leg 56 may be vertically adjusted relative to the plate 64. Finally, because of the combination of horizontally disposed slots 72 and vertical slots 74 and 76, the leg 56 may be angularly adjusted about a horizontal axis generally paralleling the pivot bolt 40 and sleeve 42.

The lower end of the leg 56 is provided with an upstanding slot 80 and the base flange 34 has a pair of inclined mounting pins 82 secured thereon and which are receivable upwardly into the lower ends of the tubular guides 24, the face of the leg 54 remote from the leg 56 being abuttingly engageable with the outer surface of the abutment block 28 in surface-to-surface contact therewith when the pins 82 are received within the tubular guides 24 and the upper surface of the base flange 34 is in abutting engagement with the lower end of the tubular guides 24.

A wheel 86 is journalled on the outer end of the stub axle 44 and the end portion of the stub axle 44 remote from the sleeve 42 is externally threaded as at 88 and is secured through the slot 80 by means of a suitable threaded fastener 90 threadedly engaged therewith.

Inasmuch as the axes of rotation defined by the pivot bolt 40 and the pivot shaft 48 are laterally spaced apart and the outboard end of the stub axle 44 is fixedly secured to the slotted lower end of the leg 56 and the sections 60 and 62 of the bight portion 58 are fixedly secured together by means of the fasteners 78, the stub axle 44 is constrained against oscillation about the longitudinal axis of the pivot bolt 40 and therefore will be maintained in a horizontal position after once being so adjusted. Of course, the leg 56 may be maintained substantially vertically disposed by means of the adjustment features of the bight portion 58 and the adjustment feature of the outer end of the stub axle 44 relative to the lower end of the leg 56 and therefore it may be seen that the transporting device 18 may be adjusted so as to perform the function desired whether the side or side walls 14 of the boat 10 be vertically disposed or angularly disposed in the manner illustrated in FIGURE 2 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An object transporting device adapted to be utilized in mounting supporting wheels on various objects to be transported from one location to another and including side mounting panels inclined at different angles relative to a vertical plane, said device including a mounting base adapted to be secured to one of said side mounting panels, a generally horizontal support shaft supported from said plate for oscillation about its longitudinal axis, said shaft including a laterally directed and generally horizontal stub axle, a wheel journalled on said axle, an upstanding stabilizing arm, the outer end of said axle and the lower end portion of said arm including first coacting portions securing said axle to said arm for vertical adjustment therealong, and second coacting means supported from said base and the upper end portion of said arm supporting said arm from said base for adjustable lateral shifting of the upper end of said arm toward and away from said base.

2. The combination of claim 1 wherein said second coacting means also includes means for supporting said arm for vertical adjustment relative to said base.

3. The combination of claim 1 wherein said second coacting means further includes means for supporting said arm for angular adjustment about an axis extending transversely of the upper end portion of said arm and generally paralleling said longitudinal axis.

4. The combination of claim 3 wherein said second coacting means also includes means for supporting said arm for vertical adjustment relative to said base.

5. An object transporting device adapted to be utilized in mounting supporting wheels on various objects to be transported from one location to another and including mounting portions variously inclined relative to a vertical plane, said device including a mounting base adapted to be secured to one of said mounting portions, a generally horizontal stub axle, and means supporting one end of said axle from said base with the other end of said axle projecting outwardly from said base, a wheel journalled on the outer end portion of said axle, said means supporting said axle from said base including means supporting said axle for angular adjustment of said axle about a generally horizontal axis extending transversely of said one end of said axle, and brace means interconnecting said base and the other end of said axle including a portion extending outwardly over said axle and wheel and terminating in a downwardly extending leg attached to said axle outwardly of said wheel, said brace means including means for adjusting the effective vertical extent of said leg.

6. The combination of claim 5 wherein said portion extending outwardly over said axle is elongated and includes longitudinally relatively extendable and angularly adjustable opposite end portions connected to said base end and said leg.

7. The combination of claim 5 wherein said means supporting said stub axle from said base includes means coacting with said base for ready downward movement of the last-mentioned means relative to said base to disengage it from said base.

8. An object transporting device adapted to be utilized in mounting supporting wheels on various objects to be transported from one location to another and including mounting portions variously inclined relative to a vertical plane, said device including a mounting base adapted to be secured to one of said mounting portions, a generally horizontal stub axle, and means supporting said axle from said base with one end of said axle projecting outwardly from said base and adapted to have a wheel journalled thereon, said means supporting said axle from said base including means operative to angularly adjust said axle about a generally horizontal axis disposed at generally right angles relative to the longitudinal center axis of said axle, said means supporting said stub axle from said base including means secured to opposite end portions of said axle and supported from said base, said means supporting said stub axle from said base including a generally inverted U-shaped member including a pair of depending legs interconnected at their upper ends by means of a bight portion, the lower end portion of one of said legs being secured to said base and the lower end of the other leg being secured to the outer end of said stub axle, said bight portion including opposite end portions extendable relative to each other.

9. An object transporting device adapted to be utilized in mounting supporting wheels on various objects to be transported from one location to another and including mounting portions variously inclined relative to a vertical plane, said device including a mounting base adapted to be secured to one of said mounting portions, a generally horizontal stub axle, and means supporting said axle from said base with one end of said axle projecting outwardly from said base and adapted to have a wheel journalled thereon, said means supporting said axle from said base including means operative to angularly adjust said axle about a generally horizontal axis disposed at generally right angles relative to the longitudinal center axis of said axle, said means supporting said stub axle from said base including means secured to opposite end portions of said axle and supported from said base, said means supporting said stub axle from said base including a generally inverted U-shaped member including a pair of depending legs interconnected at their upper ends by means of a bight portion, the lower end portion of one of said legs being secured to said base and the lower end of the other leg being secured to the outer end of said stub axle, said bight portion including opposite end portions angularly adjustable relative to each other about a generally horizontal axis extending transversely of said bight portion intermediate its opposite ends.

10. The combination of claim 9 wherein said opposite end portions are also longitudinally extendable relative to each other.

References Cited

UNITED STATES PATENTS

| | | |
|---|---|---|
| 1,633,151 | 6/1927 | Winsor. |
| 2,115,864 | 5/1938 | Liverman _____ 9—1 |
| 2,522,616 | 9/1950 | Husek _____ 280—414 |
| 2,632,655 | 3/1953 | King et al. _____ 9—1 |
| 3,035,282 | 5/1962 | Bemis _____ 9—1 |

BENJAMIN HERSH, *Primary Examiner.*

J. A. PEKAR, *Assistant Examiner.*

U.S. Cl. X.R.

9—1